United States Patent [19]

Ohzu et al.

[11] Patent Number: 5,287,379
[45] Date of Patent: Feb. 15, 1994

[54] METHOD OF PRODUCING A SMALL BEAM EXPANSION OF LASER LIGHT

[75] Inventors: Akira Ohzu; Masaaki Kato; Yoichiro Maruyama; Takashi Arisawa, all of Tokai, Japan

[73] Assignee: Japan Atomic Energy Research Institute, Tokyo, Japan

[21] Appl. No.: 955,431

[22] Filed: Oct. 2, 1992

[30] Foreign Application Priority Data

Oct. 2, 1991 [JP] Japan ................................. 3-322288

[51] Int. Cl.⁵ ..................... H01S 3/091; H01S 3/102
[52] U.S. Cl. ........................... 372/69; 372/70; 372/38
[58] Field of Search ................. 372/69, 70, 72, 75, 372/38

[56] References Cited

U.S. PATENT DOCUMENTS 4,606,034  8/1986  Eden et al. ........................... 372/23

Primary Examiner—Georgia Y. Epps
Assistant Examiner—Robert W. McNutt
Attorney, Agent, or Firm—Oblon, Spivak, McClelland, Maier & Neustadt

[57] ABSTRACT

A method of producing a small expansion of laser light, in a pulse laser apparatus, including producing a small preliminary laser light by pumping a laser medium, and then, after an appropriate time lag, then pumping the preliminary laser medium at a higher intensity than the first pumping, thereby producing a laser light which is smaller in beam expansion than in the case where a preliminary pumping is not performed. The laser light which is smaller in beam expansion is due to the population inversion occurring in a small beam expansion part of pulse laser light obtained by the preliminary pumping.

1 Claim, 3 Drawing Sheets

METHOD OF PRODUCING A SMALL BEAM EXPANSION OF LASER LIGHT

BACKGROUND OF THE INVENTION (a) Field of the Invention

The present invention relates to a method of producing a small beam expansion of laser light.

(b) Description of the prior art

Heretofore, as a method of restraining the beam expansion of pulse laser light, an unstable resonator or a self-injection locking method has been employed.

The method of utilizing an unstable resonator separates the small beam expansion from the laser light by providing a space filter within the resonator and amplifying it. The self-injection locking method is used to obtain a small beam expansion of laser light by using two laser apparatuses and injecting a laser light produced by one laser apparatus into a resonator in another laser apparatus to generate an induction release by the laser light. Therefore, in order to obtain a small beam expansion of laser light by the prior art, plural laser apparatuses are needed, or a complicated optical system must be provided and so the scale of the apparatus becomes large and the operation and control thereof becomes complicated.

SUMMARY OF THE INVENTION

An object of the present invention is to avoid such problems in the prior art and thereby provide a method of producing a small beam expansion of pulse laser light more easily.

DESCRIPTION OF THE PREFERRED EMBODIMENT

According to the present invention, a preliminary laser light is produced by a preliminary pumping in one laser apparatus and then producing a small beam expansion of laser light from this preliminary laser light, thereby attaining a method of producing a small beam expansion of laser light of the present invention.

In the present method, the pulse laser apparatus first produces a laser light by performing a preliminary pumping. After an appropriate time lag, a laser light which is higher in intensity than the pulse laser light obtained by the laser light of preliminary pumping is produced by performing a main pumping. The main pumping, which is higher than the preliminary pumping in intensity, creates the pulse laser light, having a smaller beam expansion than a laser light in the case of non preliminary pumping, by an induction release from the population inversion occurring in the main pumping in a part of the small beam expansion of pulse laser light obtained by the preliminary pumping.

Generally, a pulse laser light produces a population inversion by a pulse pumping, i.e. light excitation, electron collision, electric discharge, etc., in a laser medium, and the generated light goes and returns within the resonator to conduct the induction release, thereby a laser light is formed.

Therefore, after the pulse laser light is produced, the beam expansion of pulse laser light becomes smaller with the lapse of time.

Next, the present invention will be explained with drawings.

Figure 1:
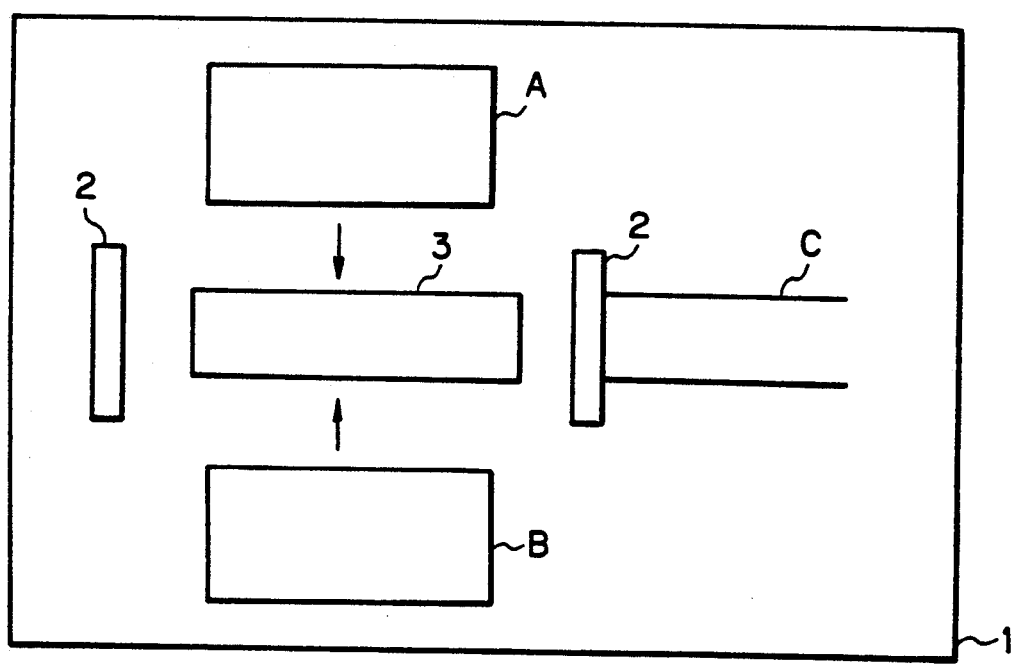
FIG. 1 is a figure illustrating the outline of the method of the present invention.

FIG. 1 is a pulse laser apparatus in which a preliminary laser pulse is produced by performing an initial pumping A by light excitation, electron collision, light irradiation, electric discharge, etc. in a laser medium 3 sandwiched in a set of resonators 2, 2. After an appropriate time lag from the preliminary pumping, a main pumping B is performed. Then performing an induction release using a small beam expansion part of the preliminary laser pulse in the population inversion formed by the main pumping, a pulse laser light C can be generated, which is smaller in beam expansion than a pulse laser light generated by one pumping.

Figure 2:
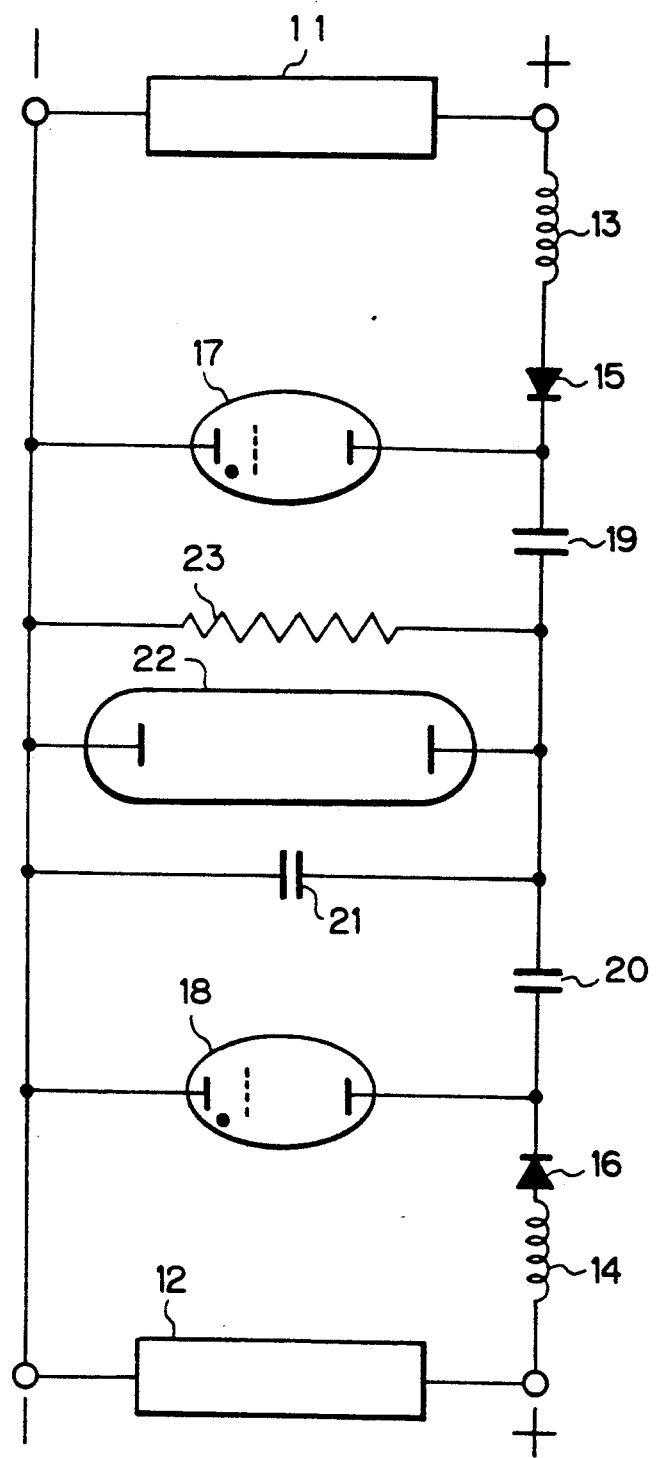
FIG. 2 is a figure showing an embodiment of the double discharge circuit in the present invention.

FIG. 2 is a figure showing an embodiment of the double electric discharge circuit for performing a preliminary pumping and main pumping in a gas laser.

In FIG. 2, a volume shifting type of pulse electric discharge circuit charged by a LC resonating type (choke coil 13, choke coil 14, condenser 19, condenser 20) is connected to a laser tube 22 in two systems (right and left circuit centering around laser tube 22).

In the initial electric discharge, when a switching element (thyratron) 17 becomes "on", an electric charge stored in a condenser 19 flows out to the electric circuit to charge a condenser 21, and simultaneously into the laser tube 22 to excite atoms and molecules in the tube and form a population inversion to generate a small laser oscilation.

When, immediately thereafter, a switching element (thyratron) 18 becomes "on", similarly a population inversion is formed in the laser tube 22.

At this time, a preliminary laser light exists as a source in the laser tube 22 and thereby an induction release occurs and a laser light which is small in beam expansion and higher in main intensity than the preliminary pulse laser light can be obtained.

After the electric discharge is over, the condensers 19 and 20 are charged through choke coils 13 and 14 respectively, and after the completion of charge, the double electric discharge is similarly repeated.

EXAMPLE

Figure 3:
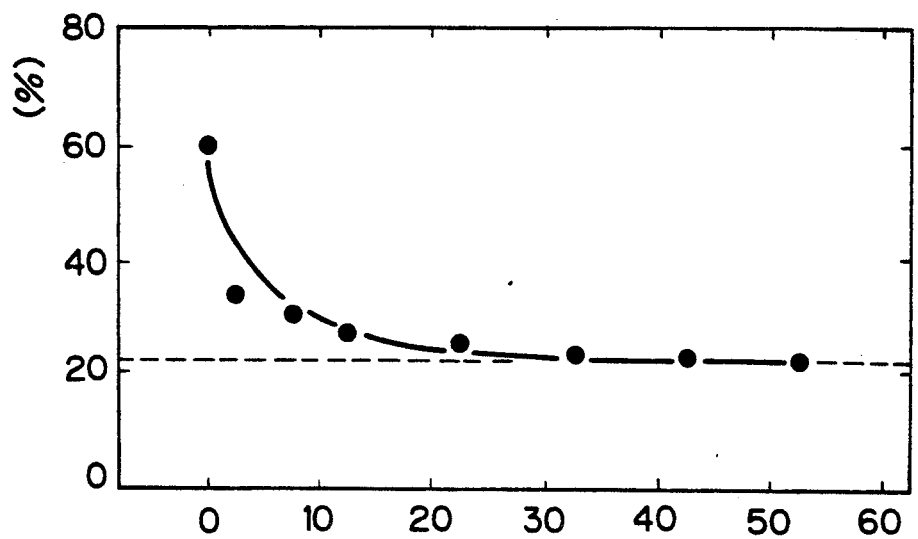
FIG. 3 is a graph showing an experimental result of the method of the present invention.

The experimental result by the method of the present invention using a copper vapor laser is shown in FIG. 3.

In FIG. 3, the abscissa shows a time lag of initial pumping and main pumping in electric discharge. The ordinate shows the percentage (%) of a 0.2 m rad component, having several times the diffraction limit, in the produced pulse laser light (refer to FIG. 4) in the total pulse laser energy, and shows that the percentage is higher when the beam expansion is smaller.

In this figure, the time lag of the abscissa is set to 0 at the point that 0.2 m rad component is at a peak. However, actually the preliminary electric discharge is earlier by about 10 ns. In this figure, the rate of the 0.2 m rad component becomes lower with the increase of time lag to be a definite value. This is due to a fact that the production of preliminary pumping is late and therefore the induction release by the preliminary pulse laser is difficult to produce. However, the influence of the preliminary laser pulse disappears soon and it becomes a definite value. This shows a value without a preliminary pumping.

Figure 4:
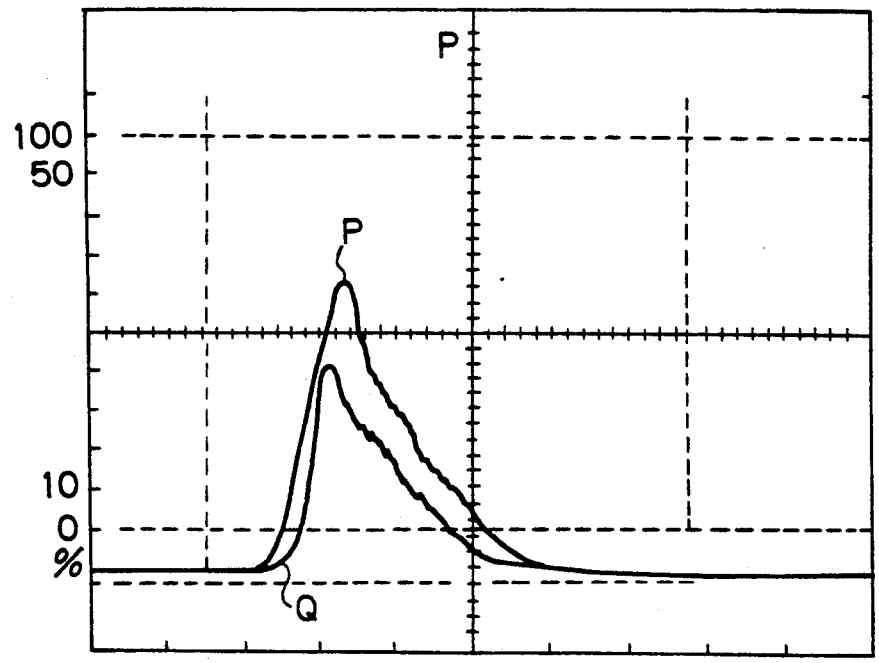
FIG. 4 shows a waveform of a laser pulse in an experiment of the method of the present invention.

FIG. 4 shows a pulse waveform of laser light observed by means of a pipe runner phototube. The waveform P is of all pulse laser light observed as it is. The waveform Q is of the 0.2 m rad component observed in the overall pulse laser light. The larger the beam expansion becomes, the waveform Q of the 0.2 m rad component becomes smaller, and as the beam expansion becomes smaller, the waveform Q approaches that of the waveform P.

What is claimed is:

1. A method of producing a small expansion of laser light comprising, in a pulse laser apparatus, producing a small preliminary laser light by pumping a laser medium, and then, after an appropriate time lag, producing a laser light which is higher in intensity than the preliminary laser light by performing a pumping which is higher in intensity than the first pumping, thereby producing a laser light which is smaller in beam expansion than in case there is not a preliminary pumping, due to the population inversion occurring in a small beam expansion part of pulse laser light obtained by the preliminary pumping.

* * * * *